United States Patent
Klotsche

(10) Patent No.: US 7,155,533 B2
(45) Date of Patent: Dec. 26, 2006

(54) PROCEDURE AND CONTROLLER FOR A PACKET-ORIENTED DATA NETWORK FOR THE TRANSMISSION OF DATA IN VARIABLE TIME SLOTS

(75) Inventor: Ralf Klotsche, Neuenburg (DE)

(73) Assignee: Alcatel, Paris (FR)

( * ) Notice: Subject to any disclaimer, the term of this patent is extended or adjusted under 35 U.S.C. 154(b) by 675 days.

(21) Appl. No.: 10/299,703

(22) Filed: Nov. 20, 2002

(65) Prior Publication Data

US 2003/0115310 A1 Jun. 19, 2003

(30) Foreign Application Priority Data

Nov. 21, 2001 (DE) ................................ 101 57 101

(51) Int. Cl.
*G06F 15/16* (2006.01)
(52) U.S. Cl. ..................... 709/235; 709/223; 370/230; 370/231; 370/232; 370/233; 370/234
(58) Field of Classification Search ................ 709/235, 709/233; 370/321, 447, 230–234
See application file for complete search history.

(56) References Cited

U.S. PATENT DOCUMENTS

| | | | | | |
|---|---|---|---|---|---|
| 5,570,355 | A | * | 10/1996 | Dail et al. .................... | 370/352 |
| 6,975,601 | B1 | * | 12/2005 | Connors ...................... | 370/321 |
| 6,996,061 | B1 | * | 2/2006 | Yang et al. .................. | 370/233 |
| 2001/0033579 | A1 | * | 10/2001 | Nelson et al. ............... | 370/447 |
| 2002/0126692 | A1 | * | 9/2002 | Haartsen ...................... | 370/450 |

* cited by examiner

*Primary Examiner*—Jason Cardone
*Assistant Examiner*—Glenford J Madamba
(74) *Attorney, Agent, or Firm*—Sughrue Mion, PLLC

(57) ABSTRACT

The invention relates to a procedure for the transmission of data in variable time slots between a controller of a packet-oriented data network on the one hand and a terminal of a user of the data network on the other hand, time slots for the data transmission being assigned to a terminal following request made by the terminal and in dependence on the transmission capacity available in the data network. In order to create the possibility of enabling known data networks for the transmission of data in variable time slots to be used also for QoS applications without restriction of the functionality, it is proposed that the data transmission rate be monitored separately for each data flow of a terminal of the data network.

17 Claims, 6 Drawing Sheets

PROCEDURE AND CONTROLLER FOR A PACKET-ORIENTED DATA NETWORK FOR THE TRANSMISSION OF DATA IN VARIABLE TIME SLOTS

BACKGROUND OF THE INVENTION

The invention is based on a priority application DE 101 57 101.1 which is hereby incorporated by reference.

The present invention relates to a procedure for the transmission of data in variable time slots between a controller of a packet-oriented data network on the one hand and a terminal of a user of the data network on the other hand. Time slots for the data transmission are assigned to a terminal following request made by the terminal and in dependence on the transmission capacity available in the data network.

The invention also relates to a controller for a packet-oriented data network for the transmission of data in variable time slots between the controller on the one hand and a terminal of a user of the data network on the other hand. The controller comprises means for receiving and processing a request made by a terminal for time slots, and means for allocating time slots upon the request made by the terminal. The means for allocation allocate the time slots in dependence on the transmission capacity available in the data network.

Finally, the present invention also relates to a computer program which can be executed on a computing device, particularly on a microprocessor, of a controller for a packet-oriented data network for the transmission of data in variable time slots.

The data rate available in the data network is determined primarily by the minimum data rate agreed between providers and users. The minimum data rate is stored, in addition to further stipulations, in a so-called service level agreement.

The available data rate is determined, secondly, by the instantaneous capacity utilization of the data network by data transmissions. For the use of the data network, the user normally makes a payment to the provider which is dependent on the agreed data rate.

A terminal seeking to transmit data via the data network sends a request for one or more time slots to a controller of the data network. Depending on the availability of time slots or depending on the capacity utilization of the data network, the controller allocates the requested number or fewer time slots to the terminal. In the case of a very high capacity utilization, it may even be the case that the controller is unable to fulfil the request made by the terminal, rejects it and does not allocate any time slots to it whatsoever. The rejected request made by the terminal is stored in a queue (e.g. in a first-in-first-out (FIFO) memory) of the controller and fulfilled at a later instant, at which there is a lesser capacity utilization of the data network, in that time slots which have been requested but not yet allocated are then allocated to the terminal. The requesting terminal and the data flow for which time slots are requested, as well as the number of requested time slots, must be stored in the queue. In addition, a corresponding time stamp must be assigned to each request. The storage of the rejected requests in the queue can be very memory-intensive. If a queue is full, new requests are lost.

Known from the prior art, therefore, for the allocation of time slots, is the practice of taking into account, at the start of a new data transmission, the capacity utilization of the data network as a whole and the bandwidth available on the data network. Once a certain number of time slots have been allocated to a terminal for the data transmission, the user may transmit his data in these time slots even if this data transmission occupies the entire transmission capacity of the data network or a major part of this capacity. During this time, requests for time slots made by other terminals may not be completely fulfilled, or not fulfilled at all. Wait times may occur before the further terminals are serviced. Thus, for the data transmissions of the further terminals, it is not possible to guarantee a minimum response time within which the requested time slots, or a minimum number of time slots, can be assigned to the terminals. This can present substantial problems for applications in which a minimum response time and a minimum data transmission rate must be assured. Such applications are also termed QoS (quality of service) applications. Examples of QoS applications are VoIP (Voice over Internet Protocol) applications.

In the case of so-called Transfer Control Protocol (TCP)/IP applications, the data transmission commences at a relatively low data rate. During a data transmission, the quality of the data transmission is monitored and, if this fulfils a predefinable minimum quality requirement, continuously increased until the minimum requirement is no longer fulfilled. The data transmission rate is then reduced again to the relatively low starting value and slowly increased again. Thus, if the quality of a TCP/IP data transmission so permits, such a data transmission may occupy a major part of the bandwidth available in a data network. In addition, a TCP/IP data transmission can result in a substantial fluctuation of the network capacity utilization. This can be a major disturbance factor for QoS applications.

The procedure according to the invention is applicable to all data networks in which the award of time slots for data transmission must be negotiated between the terminals and the controller.

The data network is designed as, for example, a cable television network via which video and audio data is transmitted according to a predefinable standard. The standard renders possible a data transmission according to the procedure of the initially stated type. A concrete example of such a standard is DVB (Digital Video Broadcasting), which is used primarily in Europe, or DOCSIS (Data Over Cable Service Interface Specification), which is used particularly in the USA. DVB uses a fixed time pattern of, for example, three milliseconds, with 9, 18 or 36 time slots being transmitted per time pattern. In DVB, the two lowest layers of the ISO/OSI layer model are specified, namely, the physical layer and the Media Access Control (MAC) layer, or link layer.

In recent times, increasingly more households have been receiving television signals, no longer via television antennae or satellites, but via a cable television network. In this case, a television transmitter transmits video and audio signals to television sets in the households, over several channels in a television broadcast band, via a so-called combiner, which essentially comprises a frequency multiplexer, and via the cable television network. In order that the cable television network can also be used for QoS applications, a switching device (a so-called router) is provided which is connected to the Internet. The router is additionally connected, via a bidirectional connection, to a controller of the network, a so-called interactive network adapter (INA) which, in turn, is likewise connected to the combiner via a bidirectional connection. The router and the INA can be combined in one device. The terminals for the QoS applications in a household are connected to the cable television network via so-called set-top boxes or so-called cable modems. Thus, the combiner transmits both the video and audio signals of the television transmitter and the data from the Internet into the households, where they are distributed to the appropriate terminals. For example, the video and audio signals are forwarded to a television set and the Internet data is forwarded to a computer. For VoIP applications, the computer is equipped with appropriate add-on modules which permit the output and input of speech.

Also provided as standard in the cable television network are upstream channels which render possible a so-called upstream connection of the terminals to the INA. In comparison with the downstream channels, however, the upstream channels have only a small bandwidth. For certain data applications, however, relatively large amounts of data are also transmitted via the upstream channel. In addition, it must be possible for a certain quality of data transmission to be guaranteed via the upstream channel (e.g. for QoS applications). The quality of a data transmission comprises, in particular, a predefinable minimum transmission rate, a limited delay time (i.e. transmission time of the individual data packets transmitted in the time slots) and a limited jitter (i.e. variation of the transmission time of the individual transmitted data packets).

SUMMARY OF THE INVENTION

The present invention is based on the object of creating a possibility of enabling known data networks for the transmission of data in variable time slots to be used also for QoS applications without restriction of the functionality.

To achieve this object, the present invention proposes, proceeding from the procedure of the initially stated type, that the data transmission rate be monitored separately for each data flow in the data network and that further time slots be allocated to the terminal for one of the data flows in dependence on the monitored transmission rate of the data flow and on stipulations imposed for the data flow.

According to the invention, therefore, it is proposed that further time slots be allocated to the terminals for a particular data transmission in a data flow in dependence on the monitored transmission rate of this data flow. An assignment of time slots in dependence on the capacity utilization of the data network as a whole, known per se from the prior art, can be superposed on this type of allocation.

The advantages of the present invention consist particularly in that the transmission rate is monitored for each individual data flow and not for the data network as a whole. Only by this means does it become possible to award time slots for each data flow individually in such a way that individual stipulations in respect of the quality of the data transmission can be taken into account and even guaranteed for each data flow individually. The stipulations comprise, for example, a minimum and/or a maximum data transmission rate. The stipulations are determined in dependence on the type of application within which the data transmission is effected, or in dependence on contractual agreements made between providers and users prior to the data transmission. With the present invention, it is possible for the first time for conventional data networks, which hitherto were used only for data transmission within the scope of the Internet, for example, according to the TCP/IP Standard, to be used also for data transmission within the scope of QoS applications, for example, for VoIP applications. The present invention is applicable to any physical data networks, for example, to cable television networks.

A minimum data transmission rate is not required for all data transmissions effected via the network. There are also so-called best-effort applications (e.g. data transmissions according to the TCP/IP Standard) in which the data transmission is not time-critical and which are transmitted when the network has free transmission capacity. According to the invention, the data rate of best-effort applications is reduced if time slots need to be requested and allocated for the transmission of data within the scope of QoS applications. Thus, if rendered necessary by the allocation of time slots for QoS applications, the number of time slots allocated for best-effort applications is reduced. By this means, the assured stipulations for the QoS applications, particularly a guaranteed transmission quality, can always be fulfilled irrespective of the capacity utilization of the data network as a whole. Thus, time slots for a data flow of a best-effort application are allocated not only in dependence on the data rate of the data flow, but also in dependence on the data rates of data flows of other applications (e.g. QoS applications). An overloading of the data network can also be prevented through preference of the QoS applications over the best-effort applications in the allocation of existing time slots for the data transmission.

Finally, the present invention provides for secure and reliable monitoring of the bandwidth of data flows via the data network. This is particularly useful for billing the use of the data network on the basis of the data rate and for rating the transmission capacities of the data network according to the stipulations. A data network is preferably rated, in respect of its transmission capacity, in such a way that QoS applications can always operated with a guaranteed data rate and best-effort applications can operate simultaneously with a minimum data rate.

According to the invention, on the one hand, a minimum data rate can be guaranteed for a data transmission provided that this is permitted by the capacity utilization of the data network as a whole. At the same time, it is possible to predefine for the data transmission a maximum data rate which, obviously, is above the minimum data rate. The lower the maximum data rate, the more terminals or users that can be connected to the data network and the more effectively can the available bandwidth of the data network be distributed to a multiplicity of users.

According to an advantageous development of the present invention, it is proposed that, as a measure of the data transmission rates of the data flows, there be monitored for each data flow a dynamic wait time which elapses between the current time and the allocation of time slots for the data transmission, and that further time slots be allocated to the terminal for one of the data flows in dependence on the monitored wait time of the data flow. The wait time is the difference between the time of the allocation of time slots and the current time. Normally, time slots are first allocated to those data flows which have the lowest wait times.

The data transmission rate of the data flow can be influenced through the wait time; the longer the wait time, the lower the data rate will be. The wait times thus permit a reduction of the data rate of the respective data flows, even down to zero in extreme cases. The wait time can be used to achieve an effective control and coordination of the data transmission, since a prospective assignment of the time slots is possible on the basis of the wait time. The operation of controlling and coordinating the data transmission comprises the so-called policing (i.e. the allocation of a limited number of time slots to the individual data flows in order to achieve a required data rate) and the so-called shaping (i.e., the allocation of time slots for optimum exploitation of the bandwidth available in the data network).

The wait times can also be divided into different categories (so-called policy levels). Time slots are then allocated in dependence on the current policy level of the data flow. If, following an increase by the wait time increment, the wait time of a data flow exceeds an upper time limit of the policy level hitherto, the next lower policy level is assigned to the data flow. If the wait time becomes smaller as time progresses, jumps into the next higher policy level are also conceivable. Jumps by several policy levels at once are also conceivable. The introduction of the policy levels substantially simplifies the handling of the individual data flows. The allocation of time slots commences, for example, with the highest-ranked policy level (with the shortest wait times).

According to a preferred embodiment of the present invention, it is proposed that the dynamic wait time for a data flow be increased by one wait time increment following the allocation of time slots for the data flow. As time progresses the wait time becomes ever shorter, until it finally falls below a predefinable value and the requested time slots, or a portion thereof, are assigned to the corresponding data flow. In this way, a maximum data rate can be predefined and assured for each data flow, such that a data flow does not occupy too much bandwidth thereby impairing other data flows, particularly data flows of QoS applications, i.e. so that the guaranteed stipulations cannot be fulfilled.

So-called DOS (denial of service) attacks are rendered substantially more difficult by the stipulation of the maximum data rate. DOS attacks are activated in the case of the prior art, for example, in that a terminal of the data network requests so many time slots for a data transmission that practically the entire bandwidth of the data network is required. There is then no more transmission capacity available for further data transmissions. In the case of the present invention, the number of time slots assigned per data flow is limited by the predefinable maximum data rate. Occupation of the entire bandwidth of a network and a consequent blocking of the data network by an application is therefore not possible.

The wait time increment is advantageously increased in dependence on the number of allocated time slots. The more time slots that are allocated to a data flow, the greater the wait time increment that is selected for this data flow and the longer the wait time for the data flow until the next allocation.

The wait time of a data flow is preferably determined in dependence on a data transmission rate which can be predefined for the data flow. The predefinable data transmission rate can be a minimum or a nominal data transmission rate or even a permitted overload. In this way, despite the wait times through which an overloading of the data network is prevented, the predefined data transmission rates of the individual data flows are fulfilled in any case.

According to another advantageous development of the present invention, it is proposed that the sum total of all requests for time slots be stored for each data flow of a terminal, the sum total being increased, upon a request for time slots, by the number of requested time slots and being lowered, upon an allocation of time slots, by the number of allocated time slots. The sum totals supersede the queues known from the prior art. The sum totals comprise, for each data flow, only the number of time slots requested at the time. It is not necessary to store additional information such as the requesting terminal, a time stamp or the data flow for which time slots are requested. The introduction of the sum totals renders possible a more rapid processing. Also avoided are an overflow of the queue and a loss of requests which exceed the capacity of the queues. Finally, the sum totals have a substantially lesser memory space requirement than the queues.

As a further way of achieving the object of the present invention, it is proposed, proceeding from the controller of the initially stated type, that the controller have means for monitoring the data transmission rate of each data flow in the data network and that the means for allocation allocate to the terminal further time slots for one of the data flows in dependence on the monitored transmission rate of the data flow and on stipulations imposed for the data flow.

Considered in an ISO/OSI layer model, there is realized in the controller an interface which maps QoS requirements out of the IP (Internet Protocol) layer and higher layers on to the MAC (Media Access Control) layer (so-called link layer).

According to an advantageous development of the present invention, it is proposed that the controller have means for executing a procedure as described above. In particular, the controller has means for monitoring and determining the wait times of individual data flows as a difference between a time of allocation of time slots and the current time, and means for allocating time slots in dependence on the wait times. In addition, the controller has storage means, assigned to the individual data flows, for storing the sum totals of the requests for time slots of the individual data flows.

Of particular importance is the realization of the procedure according to the invention in the form of a computer program which can be executed on a computing device, particularly on a microprocessor, of a controller for a data network for the transmission of data in variable time slots and is suitable for the execution of the procedure according to the invention. The computer program is preferably stored on a storage element provided for the controller. In this case, therefore, the invention is realized by a computer program stored on the storage element, so that this storage element provided with the computer program represents the invention in the same way as the procedure for the execution of which the computer program is suitable. In particular, an electronic storage medium, for example, a read-only memory, a random-access memory or a flash memory can be used as a storage element.

BRIEF DESCRIPTION OF THE DRAWINGS

Further features, application possibilities and advantages of the invention are disclosed by the following description of embodiment examples of the invention which are represented in the drawing. In this case, all described or represented features, per se or in any combination, constitute the subject-matter of the invention, irrespective of their combination in the claims or their back-reference, and irrespective of their wording or representation in the description and drawing respectively, wherein:

DESCRIPTION OF THE DRAWINGS

Figure 1:
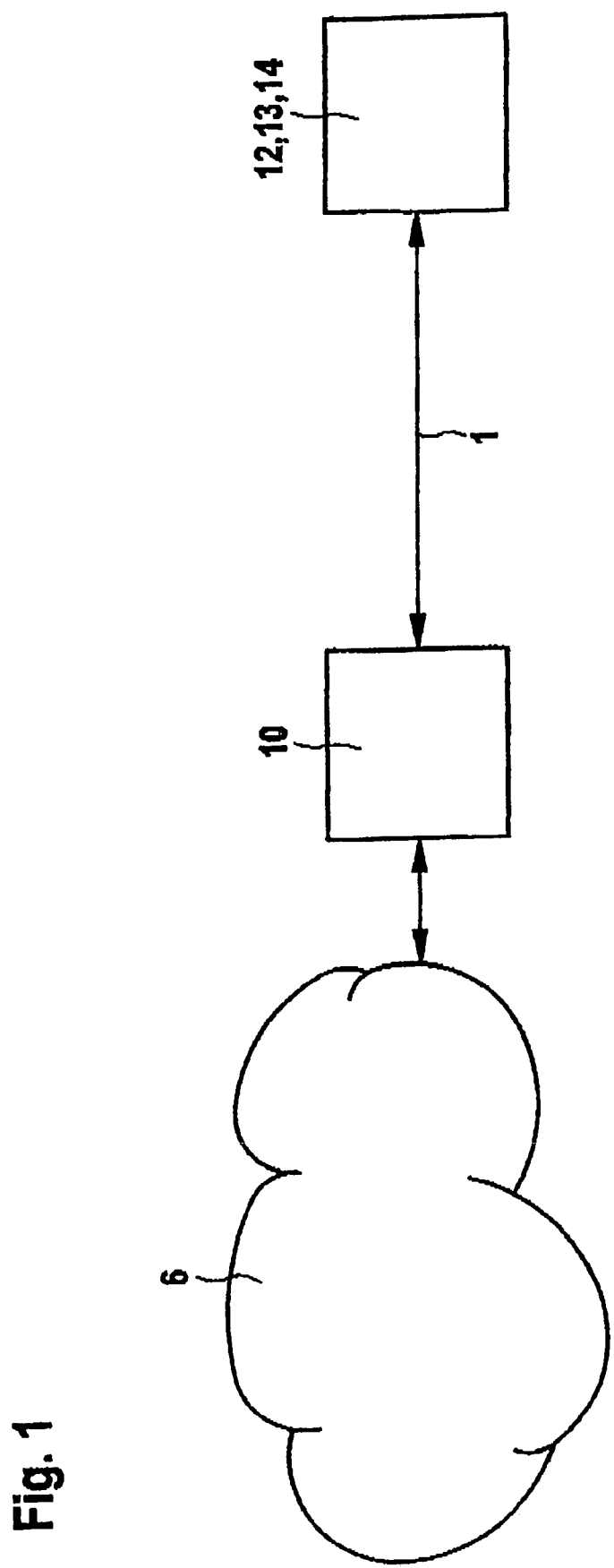
FIG. 1 shows a simplified representation of a data network for the realization of a procedure according to the invention.

In FIG. 1, the reference 1 denotes the entirety of a data network for the realization of a procedure according to the invention. The data network 1 extends between a controller 10 of the data network 1 and a terminal 13, 14. Data is transmitted via the data network in variable time slots.

The controller 10 is in the form of, for example, a so-called interactive network adapter (INA) of a cable television network and the terminal 13, 14 is in the form of, for example, a telephone 14 or an appropriately equipped computer 13. The INA is connected to, for example, the Internet 6. With the present invention, it is also possible, for example, to handle Internet data transmissions with a predefinable minimum transmission rate via the cable television network.

The controller 10 can also be in the form of a satellite transmitting/receiving station of a satellite network and the terminal 13, 14 can be in the form of, for example, a satellite telephone or an appropriately equipped computer. The satellite transmitting/receiving station is connected, for example, via a satellite network 6, to further satellite transmitting/receiving stations. With the present invention, it is also possible to transmit data with a guaranteed data transmission rate via the satellite network. This is advantageous, for example, for satellite telephony with and without video.

The present invention can therefore be used wherever, within the scope of a data transmission in variable time slots via any physical data networks 1, it is necessary to achieve a predefinable quality of the data transmission such as minimum transmission rate, limited delay time (i.e. transmission time of the individual data packets transmitted in the time slots) and limited jitter (i.e. variation of the transmission time of the individual transmitted data packets).

Figure 2:
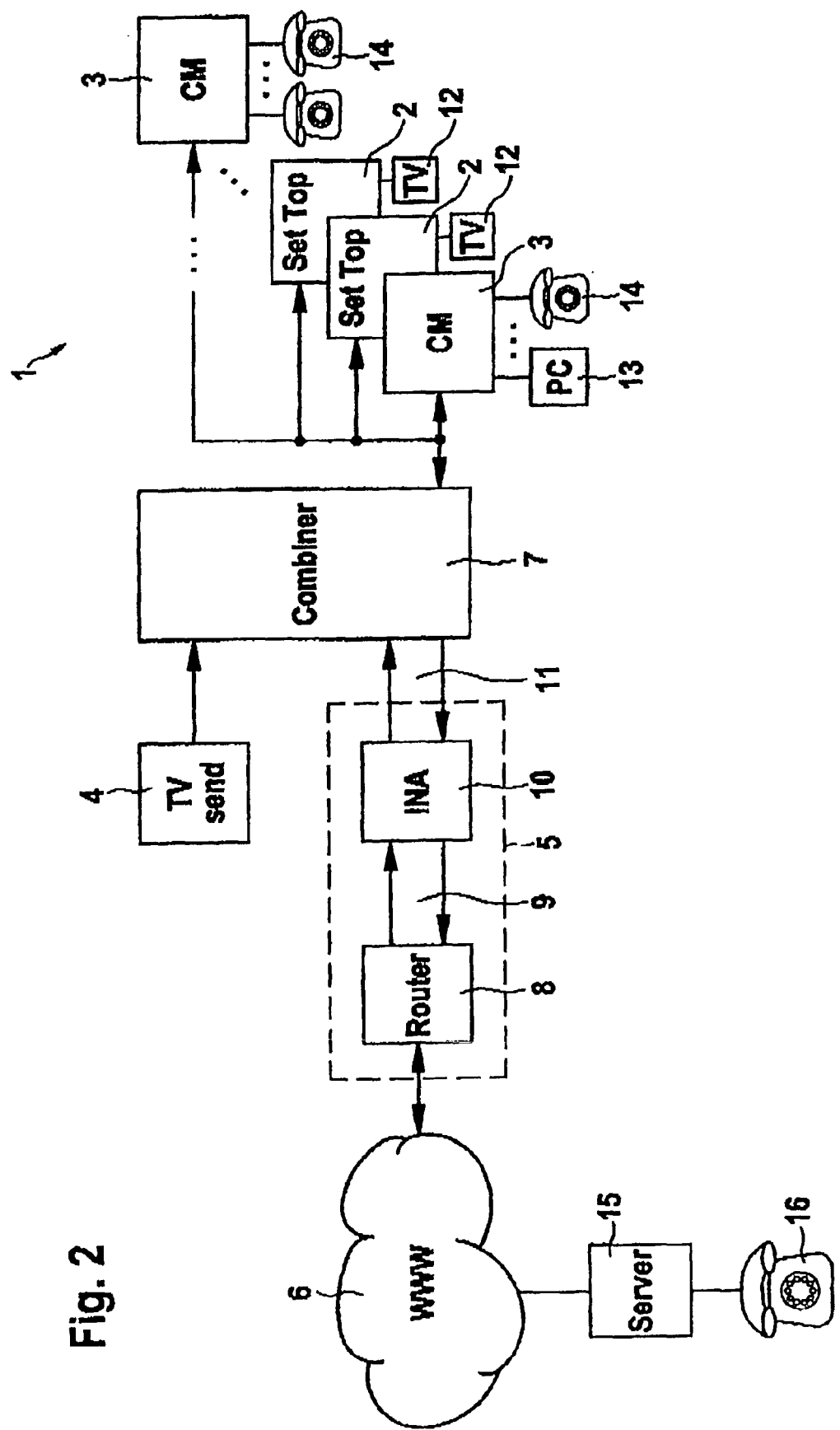
FIG. 2 shows a schematic representation of a data network for the realization of a procedure according to the invention.

FIG. 2 shows a preferred embodiment example of the data network 1 from FIG. 1. The data network 1 is in the form of a cable television network. Terminals 12, 13, 14 of users of the data network are connected, via the data network 1, to at least one service provider. The service provider is, for example, a cable television operator with which terminals, in the form of television sets 12, are connected via the cable television network 1. The cable television operator has a television transmitter 4 which transmits television signals to the television sets 12 via the cable television network 1. The television sets 12 are connected to the cable television network 1 via so-called set-top boxes 2. The service provider can also be an Internet service provider with which terminals, in the form of computers 13 or telephone sets 14, are connected via the cable television network 1. The Internet service provider has an INA 10 which is connected, via a router 8, to an Internet Protocol (IP) backbone network 6, e.g. the Internet 6. The INA 10 and the router 8 can be combined to form one device 5. The television transmitter 4 and the device 5 can also be part of the Internet 6.

Video and audio signals are transmitted from the television transmitter 4 to the set-top boxes 2, according to a predefinable standard, via the data network 1. Concrete examples of such a standard are DVB (Digital Video Broadcasting), which is used primarily in Europe, and DOCSIS (Data Over Cable Service Interface Specification), which is used particularly in the USA. The video and audio signals are transmitted via several channels in a television broadcast band.

In order that the cable television network 1 can also be used for any data applications, a combiner 7 is provided which combines the data signals and the television signals in the manner of a multiplexer and routes them, via the cable television network 1, to the terminals 12, 13, 14. Examples of data applications are Transfer Control Protocol (TCP)/IP applications (so-called Web browsing) and quality of service (QoS) applications (e.g. VoIP (Voice over Internet Protocol) applications) with particular requirements in respect of the transmission quality. The router 8 forwards IP data packets from the cable television network 1 to the Internet 6. The router 8 is additionally connected, via a bidirectional connecting line 9, to the interactive network adapter (INA) 10 which, in turn, is also connected, via a bidirectional connecting line 11, to the combiner 7. The router 8 and the INA 10 can also be combined in a single device.

The television signals emitted by the television transmitter 4 are transmitted, via the combiner 7 and the cable television network 1, to the set-top boxes 2 and further to the television sets 12. The set-top boxes 2 again divide up different data transmitted via the cable television network. The IP data packets from the Internet 6 are transmitted, via the router 8, the INA 10, the combiner 7 and the cable television network 1, to so-called cable modems 3 and further to telephones 14 or appropriately equipped computers 13. The cable modems 3 serve to receive the data service via the cable television network 1.

Connected to the set-top boxes 2 are television sets 12, video recorders or other appliances suitable for receiving and processing the video and audio signals. Connected to the cable modems 3 are terminals such as, for example, computers 13 or telephones 14, which are suitable for use of the provided data application. For VoIP applications, the computers 13 are equipped with appropriate add-on modules which render possible the output and input of speech. A further telephone set 16 is connected to the Internet 6 via an Internet server 15. Within the scope of a VoIP application, for example, audio data is transmitted between the telephone set 16 and an appropriate terminal 13, 14.

Also provided as standard in a cable television network 1 are upstream channels which render possible a so-called upstream connection from the terminals 12, 13, 14 to the INA 10. The upstream channels are required for, for example, so-called video-on-demand and for a multiplicity of data applications. For certain data applications, for example, for VoIP applications, relatively large amounts of data are also transmitted via the upstream channel. The upstream channels, however, have only a small bandwidth, which can result in an impairment of the transmission quality. For certain data applications, it should also be possible for a predefinable quality of the data transmission to be guaranteed via the upstream channel (e.g. for QoS applications). It is here that the present invention is applicable.

Figure 3:
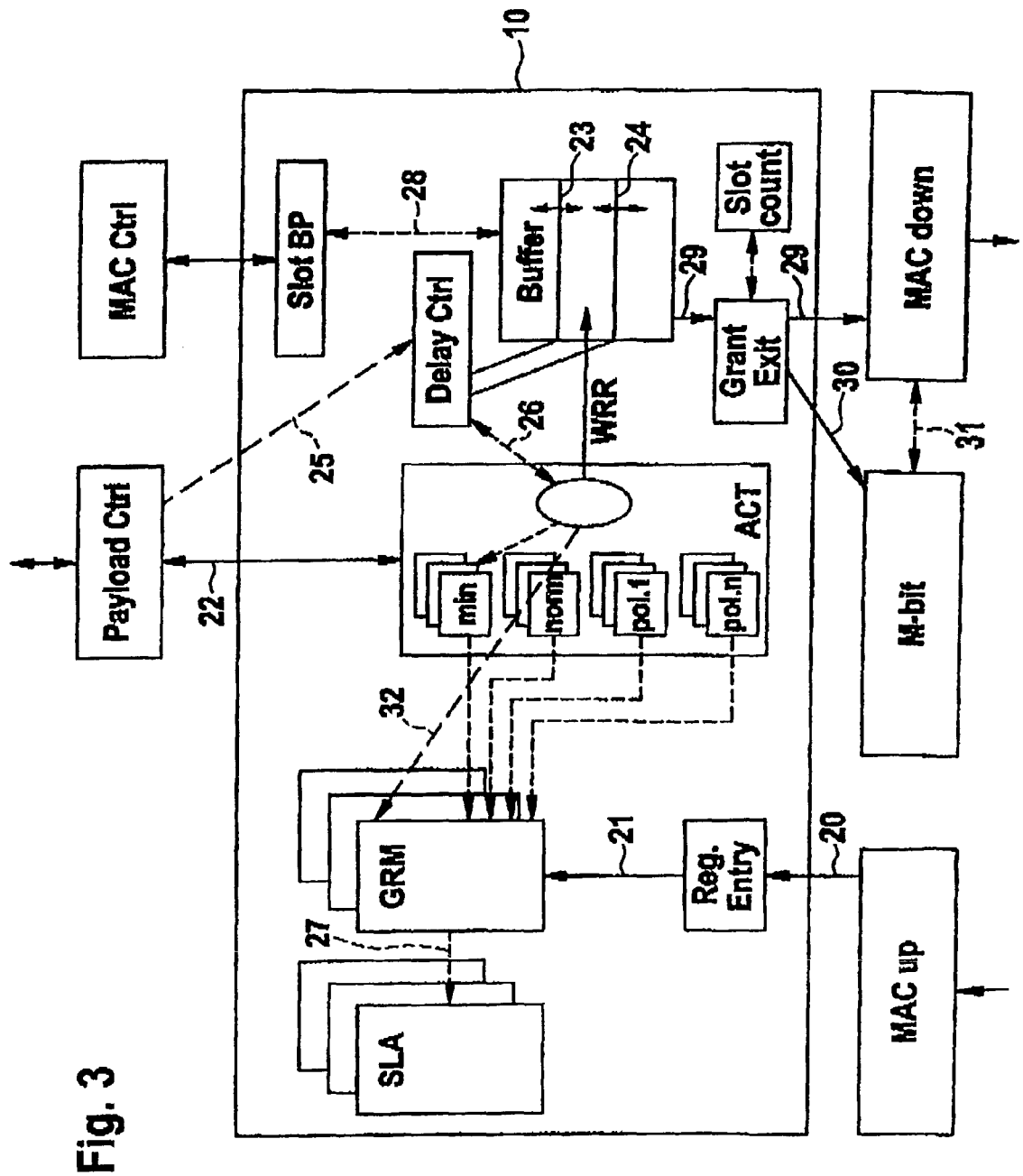
FIG. 3 shows a schematic representation of a controller, according to the invention, of the data network from FIG. 1.

FIG. 3 shows a controller 10, according to the invention, for a data network 1 according to a preferred embodiment. The controller 10 is in the form of an interactive network adapter (INA). It processes incoming requests 20 made by the terminals 12, 13, 14 for time slots for a data transmission (MAC up) via the data network 1. The terminal 12, 13, 14 seeking to send data via the data network 1 sends a request 20 for one or more time slots to the controller 10. Depending on the availability of time slots or depending on the capacity utilization of the data network 1 as a whole, the controller 10 allocates (MAC down) the requested number or fewer time slots to the terminal 12, 13, 14. The MAC message handler upstream unit (MAC up) serves to extract the requests from data packets of the MAC layer (link layer) of an ISO/OSI layer model. The MAC message handler downstream unit (MAC down) serves to package the data, via the allocated time slots, into data packets of the MAC layer.

In the controller 10, the requests 20 are forwarded to so-called grant request meters (GRM) via a pass-through unit, the grant request entry (Req. Entry). A separate grant request meter (GRM) is provided for each data flow in the data network 1. A packet-oriented (not line-oriented) connection between one of the terminals 12, 13, 14 of the data network 1 and one of the service providers 4, 5 is termed a data flow. In the grant request entry unit (Req. Entry) parameters of the requests 20 are converted to the data flows and transferred to the grant request meter (GRM) of the corresponding data flow.

Sum totals of all requests for time slots for data transmission are kept in the grant request meters (GRM) for the individual data flows. Upon the entry of a new request 20 for time slots for a particular data flow, the sum total of the corresponding grant request meter (GRM) is increased by the requested number of time slots. Following each allocation 29 of time slots for a particular data flow, the sum total of the corresponding grant request meter (GRM) is reduced by the allocated number of time slots. The sum totals represent a measure of the data quantity for which transmission capacity is requested. The sum totals kept in the grant request meters (GRM) supersede the queues for the requests known from the prior art. The introduction of the sum totals renders possible a more rapid processing. Also avoided are an overflow of the queue and a loss of requests which exceed the capacity of the queues. Finally, the sum totals have a substantially lesser memory space requirement than the queues. Each grant request meter (GRM) is assigned a particular service level agreement (SLA). The grant request meters (GRM) contain the dynamic data of the data flows, whereas the static data is stored in the service level agreements (SLA). Normally, there are fewer service level agreements (SLA) than data flows in the data network 1, so that the same service level agreement (SLA) can be assigned to several data flows. The stipulations comprise, for example, information on how a data flow must be handled within the scope of a particular application. In particular, the stipulations comprise particular quality requirements for the data transmission via the data flows.

The controller 10 additionally comprises an active flows unit (ACT) in which all active data flows are stored in a table. The table has a two-dimensional scope, the one dimension of the table depending on a predefinable quality of the data flow, a so-called QoS level, and the other dimension depending on a wait time of the data flow, which corresponds to the difference between the instant of the planned allocation of time slots for the data flow and the current time. For example, a distinction can be made, on the basis of the QoS level, between a data flow for a best-effort application and a data flow for a QoS application. The QoS level can also be used to distinguish between different requirements for the QoS applications. The QoS level is stored in the service level agreement (SLA).

Each data flow is assigned a particular QoS level from the service level agreement (SLA). The wait time of a data flow is increased by a variable wait time increment if time slots have been assigned to the data flow. The magnitude of the wait time increment is dependent on the number of allocated time slots and on the quality requirements agreed for the data transmission via this data flow. The wait time is reduced as time progresses.

The wait times of the active data flows are divided into different categories, so-called policy levels. If, following an increase by the wait time increment, the wait time of a data flow exceeds an upper time limit of the policy level hitherto, the next lower policy level is assigned to the data flow. If the wait time becomes smaller as time progresses, jumps into the next higher policy level are also possible. Jumps by several policy levels at once are also possible. The introduction of the policy levels substantially simplifies the handling of the individual data flows. In the table in the active flows unit (ACT), the active data flows are thus stored in different fields in dependence on the QoS level and the policy level.

Time slots are allocated in dependence on the current wait time, or policy level, of the data flow. Any strategies may be applied in the allocation of time slots. In one strategy, for example, starting from the highest ranked policy level (with the shortest wait times) of a particular QoS level, all requests of this policy level can be processed first. Thereafter, the requests of the next lower policy levels can each be fully processed in succession. When the requests of all policy levels of this QoS level have been processed, the requests of highest ranked policy level of another QoS level can be processed according to the same strategy.

In another strategy, for example, starting from the highest ranked policy level (with the shortest wait times) of a particular QoS level, the requests of all other policy levels of this QoS level are processed first. Thereafter, the requests of all policy levels of other QoS levels can each be fully processed according to the same strategy. Apart from the two strategies mentioned here as examples, any other strategies may be selected according to the application.

In the active flows unit (ACT), an allocation procedure is provided in the form of a so-called weighted round robin (WRR). Determined in the weighted round robin (WRR) are the processing times for the individual data flows for the allocation of the time slots. It is determined in the weighted round robin (WRR) how the information from the table is moved onwards; weightings are allocated and the available processor time is allocated to the data flows to be processed.

The information, relating to the allocation of the time slots, read out of the weighted round robin (WRR) is written into a queue, future grants output buffer (Buffer) by the weighted round robin (WRR). The information is written into a write range of the queue (Buffer). The write range is delimited by two variable thresholds 23, 24 (cf. double arrow). The positions of the thresholds in the queue (Buffer) are predefined by a delay control unit (Delay Ctrl.). In the delay control unit (Delay Ctrl.), the positions of the thresholds are determined, for example, in dependence on stipulations for the wait times and on limiting values for the minimum data transmission rates. The stipulations and limiting values 25 are transmitted from a payload control unit (Payload Ctrl.) to the delay control unit (Delay Ctrl.). The payload control unit (Payload Ctrl.) represents a protocol interface which is responsible for servicing of the signalling protocols (e.g. connection set-up/connection tear-down). The weighted round robin (WRR) writes information 26 relating to the capacity utilization of the system into the delay control (Delay Ctrl.) so that the thresholds 23, 24 can be varied accordingly.

The queue (buffer) receives information 28 from a slot boundary pattern unit (Slot BP) which receives information from a MAC control unit (MAC Ctrl.). The slot boundary pattern unit (Slot BP) represents an interface to a process which defines the sequence of different time slot types. The slot boundary pattern unit (Slot BP) specifies what is done with the time slots at which instant. The assigned time slots 29 are transferred, via a grant exit unit, out of the queue (Buffer) to the MAC message handler downstream (MAC down) at the determined instants. The information 29 is asynchronously read out of a particular memory area of the queue (buffer). The grant exit unit is connected to a slot counter (Slot Count) which enables terminals 12, 13, 14 (e.g. modems) to identify the absolute time. The slot counter (Slot Count) is responsible for a synchronization between the layer 1 and the layer 2 of the ISO/OSI layer model. The grant exit unit also transfers information 30 to an M-bit pattern generator (M-Bit). A synchronization 31 occurs between the M-bit pattern generator (M-Bit) and the MAC message handler downstream (MAC down).

The advantages of the present invention consist particularly in that the transmission rate is monitored for each individual data flow and not for the data network 1 as a whole. Only by this means does it become possible to award time slots for each data flow individually, according to particular stipulations (from the service level agreement, SLA). The stipulations are determined prior to the data transmission, in dependence on the type of application within which the data transmission is effected.

Figure 4:
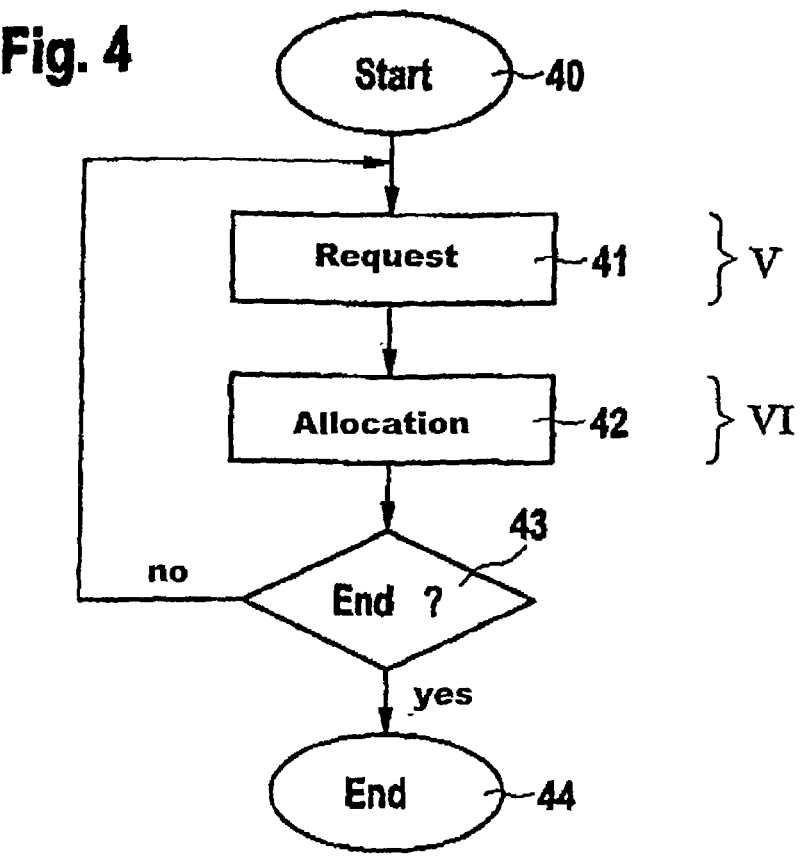
FIG. 4 shows a flow diagram of a procedure according to the invention.

FIG. 4 shows a flow diagram of a procedure according to the invention. The procedure according to the invention is applicable to all physical data networks 1 in which the award of time slots for each data transmission must be negotiated between the terminals 12, 13, 14 and the controller 10. The procedure is executed in the controller 10 from FIG. 2. It commenced in a function block 40. Two tasks are then performed in succession in the function blocks 41, 42. Incoming requests 20, from terminals 12, 13, 14 of the data network 1, for time slots for a data transmission are processed in the function block 41. In the function block 42, requested time slots are then allocated, at least partially, to the terminals 12, 13, 14. The two tasks are performed cyclically until the end of the procedure is ascertained in a query block 43. The procedure is terminated in a function block 44. Alternatively, the tasks can be called up from a higher-order control program, also, for example, through interrupts at particular instants or event-controlled, (asynchronous execution).

Figure 5:
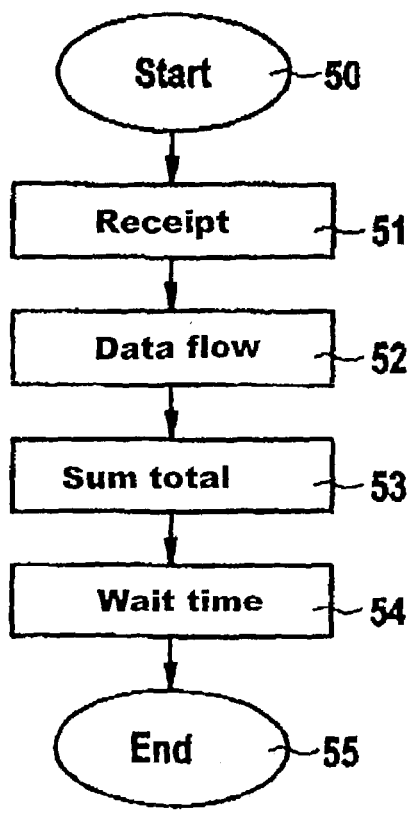
FIG. 5 shows a flow diagram of a task for processing requests within the scope of the procedure, according to the invention, from FIG. 4.

FIG. 5 shows a flow diagram of the task from function block 41 in FIG. 4. The task commences in a function block 50. A request 20 from a terminal 12, 13, 14 is received in a function block 51. A function block 52 determines the data flow for which the request 20 is intended. In a function block 53, the sum total (grant sum) of the determined data flow is increased by the number of time slots that were requested with the request 20. A starting value for the wait time of the data flow is predefined in a function block 54. In addition, the corresponding policy level of the data flow can be determined in this function block in dependence on the wait time. The task is terminated in a function block 55.

Figure 6:
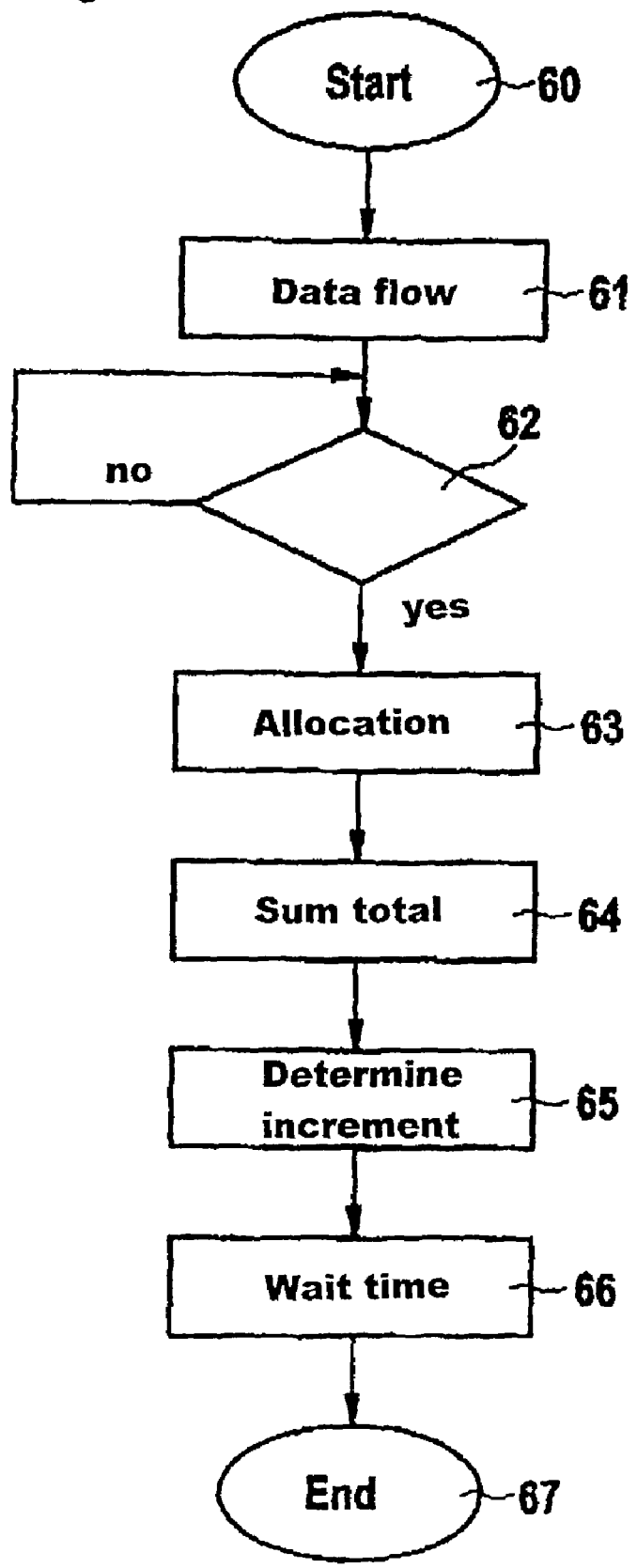
FIG. 6 shows a flow diagram of a task for allocating time slots within the scope of procedure, according to the invention, from FIG. 4.

FIG. 6 shows a flow diagram of the task from function block 42 of FIG. 4. The task commences in a function block 60. In a function block 61, a particular data flow is selected, from all active data flows, for the allocation of time slots. The data flow is selected, according to a predefinable strategy, in dependence on the wait time (policy level) and on stipulations in respect of the quality of the data transmission (QoS level) of the data flow. A strategy can be maintained during the execution of the procedure according to the invention or, alternatively, it can change in dependence on time or events. A possible strategy consists in selecting first those data flows for which there are relatively stringent stipulations in respect of the quality of the data transmission (QoS level) and whose wait times (policy level) are relatively short. Thereafter, those data flows with the some wait time, but lesser requirements in respect of quality, can be selected. Alternatively, it is also possible to select those data flows with the same requirements in respect of quality, but with longer wait times.

A query block 62 then checks whether the wait time has already elapsed for the selected data flow. The function of the query block 62 is performed until the wait time has elapsed. Once the wait time has elapsed, a predefinable number of time slots for the data transmission is allocated in a function block 63, via the selected data flow, to the terminal 12, 13, 14 which is assigned to the selected data flow. In a function block 64, the sum total of the time slots requested, but not yet allocated, for this data flow is reduced by the number of time slots allocated in the function block 63. In a function block 65, a wait time increment is determined by which the wait time is increased. The wait time increment is determined in dependence on the number of time slots allocated in the function block 63 (the more time slots that have been allocated, the greater the selected increment) and in dependence on the stipulations in respect of the quality of the data transmission (QoS level) (the predefined minimum quality requirements must be met). Moreover, the wait time increment can also be determined in dependence on the current policy level of the data flow. The wait time is then increased, in a function block 66, by the determined wait time increment. This may result in the data flow slipping into a different policy level. The task is terminated in a function block 67.

Figure 7:
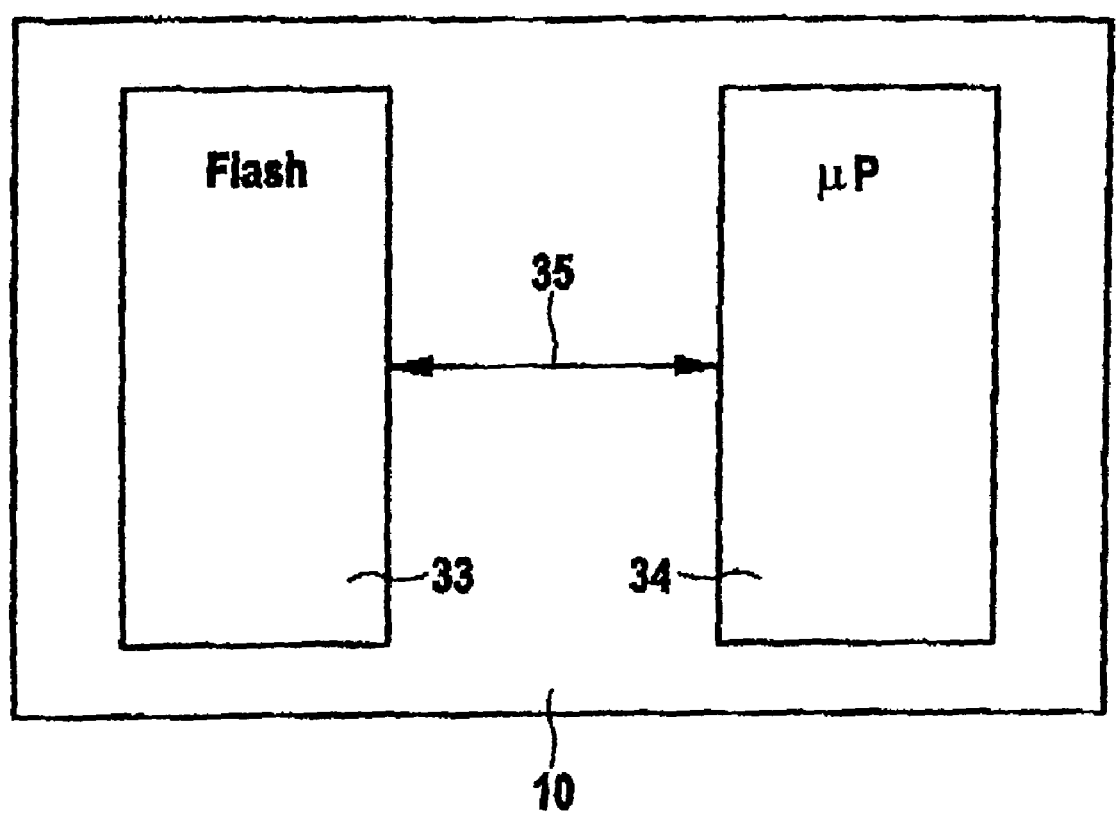
FIG. 7 shows another view of the controller from FIG. 3.

FIG. 7 shows a representation of the controller 10. The controller 10 comprises a storage element 33 on which a computer program is stored. The storage element 33 is in the form of an electronic storage medium, for example, a flash memory. The computer program can be executed on a computing device 34 of the controller 10. For the purpose of execution of the computer program on the computing device 34 the computer program is transferred, either in its entirety or instruction by instruction, out of the storage element 33 to the computing device 34 via a data transmission connection 35. The computer program, when run on the computing device 34, is suitable for execution of the procedure according to the invention.

The invention claimed is:

1. A method for the transmission of data in variable time slots between a controller of a packet-oriented data network and a terminal of a user of the data network, the method comprising assigning time slots for data transmitted to a terminal following a request made by the terminal and in dependence on the transmission capacity available in a data network, wherein a data transmission rate is monitored separately for each data flow of the terminal of the data network and further time slots are allocated to the terminal for at least one of the data flows in dependence on the monitored transmission rate of the data flow and on stipulations imposed for the data flow.

2. The data transmission method according to claim 1, wherein the data transmission rate is monitored separately for each data flow by monitoring a dynamic wait time which elapses between the current time and the allocation of time slots for the data transmission, and further time slots are allocated to the terminal for at least one of the data flows in dependence on the monitored wait time of the data flow.

3. The data transmission method according to claim 2, wherein the dynamic wait time for a data flow is increased by one wait time increment following the allocation of time slots for the data flow.

4. The data transmission method according to claim 3, wherein the wait time increment is increased in dependence on the number of allocated time slots.

5. The data transmission method according to claim 2, wherein the wait time of a data flow is determined in dependence on a data transmission rate which can be predetermined for the data flow.

6. The data transmission method according to claim 1, wherein one or more sum totals of all requests for time slots is stored for each data flow of a terminal, the sum totals being increased, upon a request for time slots, by the number of requested time slots and being lowered, upon an allocation of time slots, by the number of allocated time slots.

7. A controller for a packet-oriented data network for the transmission of data in variable time slots between the controller and a terminal of a user of the data network, the controller comprising:
   a computing device that receives and processes a request made by a terminal for time slots;
   a time slot allocating device that allocates time slots upon the request made by the terminal, the time slot allocating device allocates the time slots in dependence on the transmission capacity available in a data network; and
   a monitoring device that monitors a data transmission rate of each data flow in the data network and the time slot allocating device allocates further time slots to the terminal for at least one of the data flows in dependence on the monitored transmission rate of the data flow and on stipulations imposed for the data flow.

8. The controller according to claim 7, wherein the data transmission rate is monitored separately for each data flow by monitoring a dynamic wait time which elapses between the current time and the allocation of time slots for the data transmission, and further time slots are allocated to the terminal for at least one of the data flows in dependence on the monitored wait time of the data flow.

9. A computer program product having instructions executable by the controller, wherein the instructions perform the method according to claim 1.

10. The computer program product according to claim 9, wherein the computer program product is stored on at least one of a random-access memory, a read-only memory and a flash memory.

11. The method of claim 6, wherein the sum totals are stored in a grant request meter.

12. The controller of claim 7, wherein the time slots correspond to sum totals that are stored in a grant request meter.

13. The method of claim 11, wherein the grant requests includes dynamic data of the data flows.

14. The controller of claim 12, wherein the grant requests includes dynamic data of the data flows.

15. The method of claim 11, wherein the sum totals have a substantially less memory space requirement than the queues correspond to the requests forwarded to controller.

16. The controller of claim 12, wherein the sum totals have a substantially less memory space requirement than the queues correspond to the requests forwarded to controller.

17. The controller of claim 7, wherein each data flow in the data network has a grant request meter that stores dynamic data corresponding to the data flow.

* * * * *